United States Patent
Matzdorf et al.

(10) Patent No.: US 8,277,688 B2
(45) Date of Patent: Oct. 2, 2012

(54) ALUMINUM ALLOY COATED PIGMENTS AND CORROSION-RESISTANT COATINGS

(75) Inventors: Craig Matzdorf, California, MD (US); William Nickerson, Fairfax, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 13/192,158

(22) Filed: Jul. 27, 2011

(65) Prior Publication Data
US 2012/0187350 A1 Jul. 26, 2012

Related U.S. Application Data

(63) Continuation-in-part of application No. 13/010,830, filed on Jan. 21, 2011.

(51) Int. Cl.
C09K 3/00 (2006.01)
C23F 11/00 (2006.01)
C11D 3/12 (2006.01)
A01N 43/64 (2006.01)
A61K 31/41 (2006.01)

(52) U.S. Cl. .......... 252/387; 252/389.52; 510/334; 514/359; 514/375; 514/394; 514/396; 514/717; 524/382; 524/406; 524/407

(58) Field of Classification Search .......... 252/387, 252/389, 389.52; 524/80, 94, 382, 406, 407, 524/417, 439, 440; 510/199, 334, 378, 421; 514/359, 375, 394, 396, 415, 717
See application file for complete search history.

(56) References Cited

U.S. PATENT DOCUMENTS

| | | | | |
|---|---|---|---|---|
| 4,141,725 A | * | 2/1979 | Murai et al. | 420/541 |
| 4,459,335 A | * | 7/1984 | Tanaka et al. | 428/323 |
| 2007/0096060 A1 | * | 5/2007 | Arafat et al. | 252/387 |
| 2010/0197836 A1 | * | 8/2010 | Price et al. | 524/94 |

FOREIGN PATENT DOCUMENTS

WO   WO 2006/088518 A2 * 8/2006

* cited by examiner

*Primary Examiner* — Bijan Ahvazi
(74) *Attorney, Agent, or Firm* — Mark O. Glut

(57) ABSTRACT

This invention relates to galvanic aluminum alloy powder-pigments coated with a semi-conducting corrosion inhibiting oxide and the process for preparing said coated powder-pigments in combination with film-forming binders for coating metal substrates to inhibit corrosion. The coated aluminum alloy powder-pigments are electrically active and prevent corrosion of metals which are more cathodic (electropositive) than the aluminum alloy pigments.

11 Claims, 7 Drawing Sheets

ALUMINUM ALLOY COATED PIGMENTS AND CORROSION-RESISTANT COATINGS

This application is a continuation-in-part of co-pending application Ser. No. 13/010,830, filed on Jan. 21, 2011 (Navy Case PAX-53).

STATEMENT OF GOVERNMENT INTEREST

The invention described herein may be manufactured and used by or for the Government of the United States of America for governmental purposes without the payment of any royalties thereon or therefore.

FIELD OF THE INVENTION

This invention relates to galvanic aluminum alloy powder-pigments coated with an effective amount of semi-conductor in combination with a film-forming binder for application to metal substrates. The combination of the coated powder-pigment and film-forming polymeric binder with additional ionic corrosion-inhibiting compounds results in an electrochemically active coating composition which provides cathodic protection to metal substrates.

Various surfaces and particularly metal surfaces require the protection of coatings especially when the surfaces are exposed to corrosive environments. Metal surfaces of aircraft, for example, are exposed to seawater which requires protection from corrosion. Specifically, aircraft, e.g., Navy aircraft, are exposed to seawater spray in addition to various acid-forming gases such as sulfur dioxide, carbon dioxide, etc. Moreover, in addition to aircraft, various machinery and equipment in the industrial environments, where fossil fuels are used, need protection against corrosion. It is important therefore that the coating be resistant to corrosion, various chemicals, the weather and at the same time be flexible and have good adhesion to the metal surface.

BACKGROUND

Many metallic pigments are known which provide electrochemical, electrical, thermal, barrier and other properties to compositions which are used for protecting materials such as metal from corrosion, maintaining electrical conductivity, shielding equipment from electromagnetic fields, resisting elevated temperatures, and providing protection from moisture. Silver, gold and other noble metal pigments are used for their electrical conductivity and thermal conductivity properties. Zinc and magnesium are used for their electrochemical properties. Aluminum is used for its thermal and chemical barrier properties. A major shortcoming of the noble metals is their strong cathodic potential. When used in products for electrical and thermal management, the noble metals can couple with anodic materials like aluminum alloys used for electrical equipment.

Some shortcomings of zinc pigments include low electrical conductivity and low thermal conductivity compared to the noble metals as well as their relatively poor resistance to chlorides and other corrosive materials. A shortcoming of magnesium pigments is their high relative anodic potential compared to other metals. In addition, magnesium forms a protective oxide spontaneously in air, rendering it less effective than zinc for the sacrificial protection of steel and other cathodic materials.

Galvanically active metallic powders or "pigments" have been added to coatings or paints for at least 60 years. These pigments are intended to impart galvanic or electrochemical protection to the coated metal, to polarize the metal to an operating potential which does not allow for corrosion to occur. Coatings containing zinc or magnesium-based pigments are the most common. Zinc is typically used to protect steel. U.S. Pat. No. 3,615,730 discloses zinc-rich primers based on inorganic silica which binds and supports the zinc powder and keeps it intact to the substrate. Zinc-rich primers based on organic epoxy and polyurethane resins are commercially available and specified by DoD in MIL-DTL-24441 Formula 159, MIL-P-21035, and A-A-5975. A major drawback is that zinc-based galvanic primers or protective coatings do not perform well in highly corrosive acidic chloride environments leading to premature corrosion and hydrogen cracking of high-strength steel alloys. Another problem is that zinc is cathodic to aluminum and its alloys in many environmental conditions and therefore will not provide galvanic protection.

Another class of metal-filled coatings is based on magnesium powder. The US Navy investigated the merit of magnesium-rich epoxy primers and documented the results of performance of these coatings on aluminum alloys in NADC-MA-7063, "Investigation of Metallic Pigments as Corrosion Preventives in Aircraft Primers," A. Stander, Oct. 5, 1970. These coatings were not adopted by the Navy as they did not perform as well as the chromated epoxy primers qualified to MIL-P-23377, and used on aircraft at the time, especially in $SO_2$ salt fog testing as defined by ASTM G85.

Magnesium-rich primers developed by North Dakota State University and documented in US Patent applications US 2007/0128351 A1 and US 2009/0155598 A1, which are commercially available from Akzo Nobel exhibit similar performance limitations. Regardless of what is done to these coatings, the operating potential of magnesium remains very high (negative) compared to aluminum, leading to higher self-corrosion rates and lower efficiencies. These coatings also exhibit unusual failure mechanisms which are not well understood.

U.S. Pat. No. 5,336,303 discloses electrochemically active paints based on magnesium, magnesium alloys and calcium alloys which have a high (negative) operating potential to protect steel substrates. These coatings provide protection, but also suffer from high self-corrosion rates, low efficiencies and poor performance in highly acidic chloride environments like those seen by Navy aircraft, ships, and facilities.

Coatings with aluminum powders have been used for over 100 years. These coatings are excellent barriers to the environment and provide good thermal stability and protection. Many bridges, tanks and other steel structures have been painted with aluminum-pigmented coatings over the years with much success. These coatings do not, however, provide galvanic or electrochemical protection of the metal surface on which they are coated, since the aluminum powder or flakes are covered with aluminum oxide which inhibits electrochemical action. These uses and shortcomings are well documented in "Aluminum Paint and Powder by J. D. Edwards and R. I. Wray, $3^{rd}$ Edition, 1955.

Magnesium, Zinc and Aluminum anodes are currently used in bulk form to protect metal from corrosion. To be effective, however, the anodes need to be in contact electrically with the object they are protecting when immersed in water or an electrolyte. There is extensive literature which describes the pros and cons of each anode material. Aluminum anodes are preferred, since they are inexpensive and provide the highest efficiency of the three metals.

Table 1 shows the electrical output and cost effectiveness of these three metals based on weight. With regard to recent spot prices for each metal and their relative cost effectiveness clearly aluminum is superior to zinc and magnesium and therefore preferred based on cost, weight and longevity.

Table 1: Comparison of Electrical Properties of Magnesium, Zinc and Aluminum (from Reding, J. T. Newport, J. J.: The Influence of Alloying Elements on Aluminum Anodes in Sea Water. Materials Protection, Vol. 5. December 1966, pages 15-19).

TABLE 1

Properties and Costs of Magnesium, Aluminum, and Zinc

|  | Mg | Al | Zn |
|---|---|---|---|
| Theoretical Potential (volts) | 2.61 | 1.90 | 1.00 |
| Electrical Output (amp hrs/lb) | 1000 | 1352 | 372 |
| Metal cost (cents/lb) | 35 | 24.5 | 14.5 |
| Cost of current at 100% efficiency (cents/amp/amp-hr) | .035 | .018 | .039 |

Before the 1970's aluminum anodes were not used for the same reasons stated herein for aluminum powders and flakes. The bulk material rapidly passivated, rendering the anode inactive and incapable of protecting the intended metal object. The development of activated aluminum alloys began in the mid-1960's. The intellectual property is documented in U.S. Pat. Nos. 3,379,636; 3,281,239; 3,393,138 by Dow Chemical and U.S. Pat. No. 3,240,688 by Olin Mathesin. All of these alloys were unique in that for the first time bulk aluminum alloys were shown to remain active and galvanically protect metal. Unfortunately, none were commercially successful as they all suffered from low efficiencies making them less economical than zinc anodes. During the 1970's, Dow developed an aluminum anode alloy, which does not passivate and has very high efficiencies, approaching 90% of theoretical.

In addition to being highly efficient versus theoretical, this alloy was designed to have an operating potential of −1.05 volts versus the Ag/AgCl reference electrode. This is about the same as zinc and optimum for protecting aluminum and steel structures. Aluminum alloys used on aircraft, amphibious and ground vehicles, and other common DoD and commercial applications have operating potentials that range from about −0.800 to −0.700 volts and alloy steels have operating potentials around −0.650 volts. The operating potential gap between the aluminum anode and the materials it is designed to protect is therefore about 200-300 millivolts for aluminum and 350 millivolts for steel. This gap is enough to provide protection, but not so large that the anode rapidly self corrodes, like magnesium. This anode alloy has been investigated for use as a bulk coating of concrete with imbedded steel rebar and applied by flame spray processes.

This invention relates to a process to coat aluminum alloy powder-pigments which are electrochemically active. An additional novel feature is the ability of the coating process to transform electrically inactive standard aluminum particles, which are typically insulating due to the aluminum oxide coating which forms on them in the natural environment, to electrically active aluminum particles. It also includes the method to use these coated pigments in a coating intended to inhibit corrosion of metal substrates. Experiments show that an effective semi-conducting corrosion inhibiting coating can be produced on the aluminum alloy powder-pigments which inhibit self corrosion of the particles, but does not degrade the corrosion-inhibiting properties of the particles in the coating.

Examples of the process to make these coatings and the method of using these corrosion-protected pigments in a corrosion-inhibiting coating are discussed herein.

It is therefore an object of this invention to incorporate electrochemically active powder-pigments into a binder to provide cathodic protection to metal substrates without the need of an external power supply.

It is another object to provide cathodic protection to metal substrates by coating the substrate with a sacrificial anode coating that keeps the electrochemical potential of the substrates negative to prevent its corrosion.

SUMMARY OF THE INVENTION

In general, this invention is directed to galvanic aluminum alloy powder-pigments prepared in an atmosphere selected from the group consisting of oxygen, nitrogen-inert gas, e.g., argon and nitrogen-hydrogen, which have a particle size ranging from about 2 to 100 microns; said aluminum alloy powder-pigments have the formula Aluminum-X—Y wherein X is an element selected from the group consisting of zinc, cadmium, magnesium, barium and manganese, and Y is an element selected from the group consisting of indium, gallium, tin, and bismuth. The aluminum alloy powder-pigments are coated with an effective amount of a semi-conducting corrosion-inhibitor. In one example, the semi-conducting corrosion-inhibitor may be derived from an acidic aqueous solution consisting essentially of from about 0.01 to 22 parts by weight of a trivalent chromium compound, from about 0.01 to 12 parts by weight of a hexafluorozirconate, from about 0.01 to 12 parts by weight of at least one fluorocarbon selected from the group consisting of tetrafluoroborates, hexafluorosilicates, and hexafluorotitanates.

In another example, the semi-conducting corrosion-inhibitor may be derived from an acidic aqueous solution consisting essentially of from about 0.01 to 22 parts by weight of a trivalent chromium compound, from about 0.01 to 12 parts by weight of a hexafluorozirconate, from about 0.01 to 12 parts by weight of at least one fluorocarbon selected from the group consisting of tetrafluoroborates, hexafluorosilicates, and hexafluorotitanates and from about 0.01 to 12 parts by weight of at least one divalent zinc compound.

In another example, the semi-conducting corrosion-inhibitor may be derived from an acidic aqueous solution consisting essentially of from about 0.01 to 22 parts by weight of a trivalent chromium compound, from about 0.01 to 12 parts by weight of a hexafluorozirconate, 0.01 to 12 parts by weight of at least one fluorocarbon selected from the group consisting of tetrafluoroborates, hexafluorosilicates, and hexafluorotitanates, from about 0.00 to 12 parts by weight of at least one divalent zinc compound, and from about 0.01 to 5 parts by weight of water soluble organic corrosion inhibitor.

In another example, the semi-conducting corrosion-inhibitor may be derived from an acidic aqueous solution consisting essentially of from about 0.01 to 22 parts by weight of a trivalent chromium compound, from about 0.01 to 12 parts by weight of a hexafluorozirconate, from about 0.00 to 12 parts by weight of at least one divalent zinc compound, effective amounts of at least one stabilizing compound selected from the group consisting of polyhydroxy compounds, carboxylic compounds and mixtures of the polyhydroxy and carboxylic compounds, and from about 0.00 to 5 parts by weight of water soluble organic corrosion inhibitor.

For purposes of this application, whenever a range for a component specified herein is from 0.00 to some amount, this component is optional.

The coated aluminum alloy powder-pigments in a binder are designed to provide electrochemical protection to aluminum, steel and other metallic substrates on which they are applied and are capable of withstanding the severe operating environment of Navy aircraft, ships and facilities.

DETAILED DESCRIPTION

Figure 1:
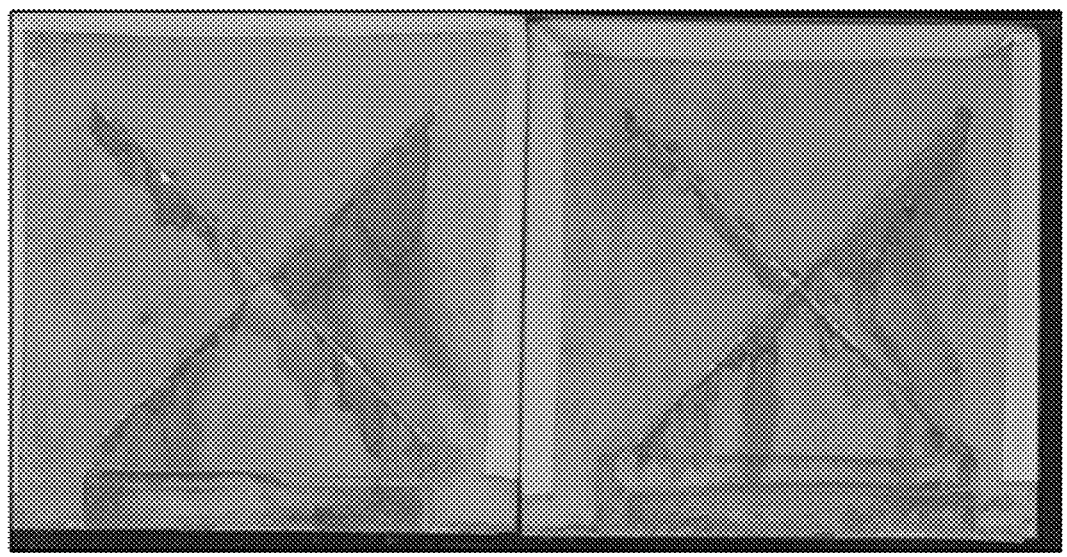
FIG. 1: Epoxy primer with active aluminum pigment after 1000 hours exposure to ASTM B117 salt fog. Substrate is 2024-T3 aluminum alloy.

This invention relates to corrosion-inhibiting aluminum alloy powder-pigments and compositions for coating metal substrates including, for example, aluminum, aluminum alloys, iron and various other ferrous metals such as steel.

The electrochemically corrosion-resistant coating compositions of this invention for application to metal substrates consisting essentially of, in parts by weight, from about 5 to 80 parts of a film-forming binder, from about 0.1 to 10 parts and preferably 1.0-5.0 or 2.0 to 4.0 parts of at least one ionic-corrosion inhibitor, from about 0.0 to 5.0 parts and preferably 0.1 to 1.5 parts of at least one wetting agent or surfactant and from about 0.0 to 5.0 parts of solvent such as water or an organic solvent, and from about 20 to 80 parts of a galvanic aluminum alloy powder-pigment prepared in an atmosphere selected from the group consisting of oxygen, nitrogen/inert gas and nitrogen-hydrogen and has a particle size ranging from about 2 to 100 microns; said aluminum alloy powder pigment coated with an effective amount of corrosion-inhibitor and has the formula Aluminum-X—Y wherein X is an element selected from the group consisting of zinc, cadmium, magnesium, barium, and manganese and Y is an element selected from the group consisting of indium, gallium, tin and bismuth.

More specifically, the galvanic aluminum alloy powder-pigment in the coating was prepared in an atmosphere selected from the group consisting of oxygen, nitrogen/argon or nitrogen-hydrogen and has a particle size ranging from about 10 to 100 microns; said aluminum alloy powder-pigments having the formula Aluminum-X—Y wherein X is an element selected from the group consisting of zinc, cadmium, magnesium, barium and manganese, and Y is an element selected from the group consisting of indium, gallium, tin and bismuth.

The aluminum alloy powder-pigment is coated with effective amounts of semi-conductor derived from an acidic aqueous solution having a pH ranging from about 2.5 to 5.5 and consist essentially of, in parts by weight, from about 0.01 to 22 parts by weight of a trivalent chromium compound, from about 0.01 to 12 parts by weight of a hexafluorozirconate, from about 0.01 to 12 parts by weight of at least one fluorocarbon selected from the group consisting of tetrafluoroborates, hexafluorosilicates, and hexafluorotitanates.

Another effective acidic aqueous solution consists essentially of from about 0.01 to 22 parts by weight of a trivalent chromium compound, from about 0.01 to 12 parts by weight of a hexafluorozirconate, from about 0.01 to 12 parts by weight of at least one fluorocarbon selected from the group consisting of tetrafluoroborates, hexafluorosilicates, and hexafluorotitanates and from about 0.01 to 12 parts by weight of at least one divalent zinc compound.

Another effective acidic aqueous solution consists essentially of from about 0.01 to 22 parts by weight of a trivalent chromium compound, from about 0.01 to 12 parts by weight of a hexafluorozirconate, 0.01 to 12 parts by weight of at least one fluorocarbon selected from the group consisting of tetrafluoroborates, hexafluorosilicates, and hexafluorotitanates, from about 0.00 to 12 parts by weight of at least one divalent zinc compound, and from about 0.01 to 5 parts by weight of water soluble organic corrosion inhibitor.

Another effective acidic aqueous solution consists essentially of from about 0.01 to 22 parts by weight of a trivalent chromium compound, from about 0.01 to 12 parts by weight of a hexafluorozirconate, from about 0.00 to 12 parts by weight of at least one divalent zinc compound, effective amounts of at least one stabilizing compound selected from the group consisting of polyhydroxy compounds, carboxylic compounds and mixtures of the polyhydroxy and carboxylic compounds, and from about 0.00 to 5 parts by weight of water soluble organic corrosion inhibitor.

The aluminum alloy was procured in bulk from Galvotec Inc., a qualified supplier for MIL-A-24799. Ames National Laboratory processed an initial lot of this bulk aluminum alloy to spherical powders using their gas atomization process. The bulk aluminum metal alloy can be processed in an oxygen, nitrogen/inert gas or a nitrogen/hydrogen, ($N_2/H_2$) atmosphere to obtain spherical aluminum alloy powder-pigments. The aluminum powders received from Ames were sieved in three powder size ranges: <20 microns, 20 to 45 microns, and 45 to 100 microns. Examples were prepared with the <20 micron powders, since the thickness of the initial coatings of interest for naval aircraft are approximately 25 microns or one-thousandth of an inch thick.

A second lot of bulk material, approximately 800 pounds, was processed by Valimet, Stockton, Calif., into approximately 7 micron average particle size spherical powders using gas atomization in a nitrogen atmosphere. The 7 micron powder is preferred as it is 3 to 4 times smaller than the average primer thickness used on aircraft and will yield high quality coatings without rough surfaces due to particles which are larger than the thickness of the primer.

The smaller diameter pigment also has a much larger surface area than the 20+ micron particles typically available. The larger surface area is theoretically more advantageous for corrosion protection as more area is available from the pigment to protect its intended surface of aluminum, steel, etc.

The ionic-corrosion inhibitor added to the coating composition is selected from the group consisting of (Hybricor 204) an inorganic hydro-talcite clay, benzimidazole, benzothiazole, benzoxazole, diphenyltriazole, benzotriazole and tolylazole. Effective amounts of solvent for the coating, e.g., water or an organic solvent rang up to about 50%, e.g. from about 10-25% by weight of the wet coating.

The binder for the coating composition is selected from the group consisting of polyacrylates, polurethanes, polyimides, polymers derived from epoxies, polymers derived from isocyanates, and the uncured pre-polymers or monomers of said polymers. The film-forming binder also can be selected from the group consisting of inorganic polymers derived from silanes, siloxanes and silicones.

The specific aluminum alloy powder-pigment (Al—X—Y) was found to be superior in the coatings because in theory, a metal that is less noble than another in which it is in contact, e.g., aluminum on steel, can function as a corrosion inhibitor when added to a coating as pigment particles or powder. However, aluminum particles, whether in a coating or not, have a naturally forming oxide film on their surface which is electrically insulating and prevents the aluminum from protecting these materials from corrosion. In addition, the open circuit potential of unalloyed aluminum particles is essentially the same as the aluminum alloy substrate and steel they are intended to protect. As such, no driving force (voltage) exists to provide galvanic protection. Therefore, it was found necessary to add very small alloying elements to aluminum and aluminum alloys to make the alloy more anodic and inhibit the formation of aluminum oxide on the surface of the particles. Aluminum particles of this nature have the proper operating potential, remain electrically active and are able to prevent corrosion of metals which are more cathodic (electropositive) than the particles. For purposes of this invention, the aluminum alloy Al—X—Y was made into powder pigments. Further improvement in corrosion protection of a metal substrate is possible by coating the powder-pigment with a very thin nanometer-scale semi-conducting corrosion inhibiting oxide. This coating provides necessary electrical properties in the pigment, reduces self corrosion of the powder-pigment by acting as a barrier to the environment, and improves particle adhesion to other materials, including resins used to make protective coatings. Even further improvement in corrosion protection of a metal substrate is possible by the addition of an ionic-corrosion inhibitor such as triazole or talcite clay, which also helps to inhibit the self-corrosion of the active aluminum alloy pigments and extends the corrosion protection of the metal being protected. The Al—X—Y powder pigments inhibit corrosion on their own, but are even more effective when coated with a semi-conducting corrosion inhibiting oxide and combined in a coating with an additional ionic-corrosion inhibitor. For the purpose of this invention, this inhibitor includes talcite clay, benzimidazole, benzothiazole, benzoxazole, diphenyltriazole. benzotriazole and tolyltriazole.

The following Examples illustrate the aluminum-rich alloy (Al—X—Y) coating compositions of this invention. The examples disclose a process for coating aluminum alloy pigments which are electrochemically active as well as standard aluminum particles which are typically not electrochemically active due to the aluminum oxide coating which forms on them in the natural environment. The examples also include the method of using these pigments in a coating to inhibit corrosion of metal substrates. The examples further show that an effective amount of semi-conducting corrosion inhibiting coating can be produced on the aluminum or aluminum alloy pigment which inhibits self corrosion of the pigment, but does not degrade the corrosion-inhibiting properties of the pigment in a coating. The process to make these coatings and the method of using these coated pigments in a corrosion-inhibiting coating are shown in the examples.

Specifically, pigments based on active aluminum alloys such as Al—5% Zn—0.015% In provide corrosion protection to aluminum substrates like 2024-T3 and 7075-T6, but are sometimes prone to "self-corrosion" which leads to consumption of the pigment from its own reaction with corrosive species and not the sacrificial corrosion protection of the substrate. This self-corrosion does not degrade the surface intended to be protected, but causes the coating in which the pigment is loaded to stain, streak and exhibit white corrosion products of aluminum oxide and aluminum hydroxide.

Figure 2:
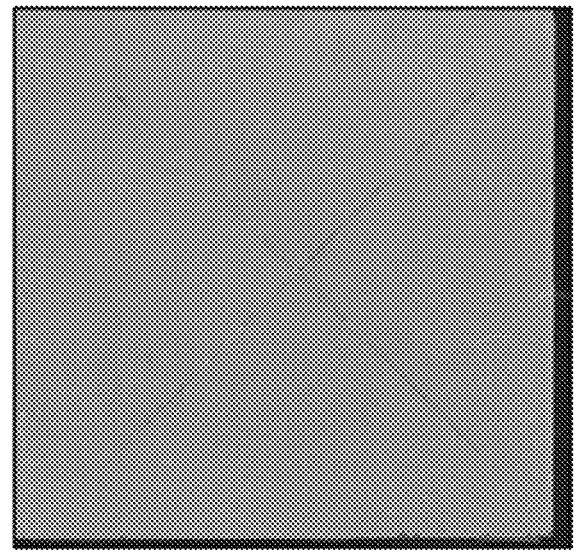
FIG. 2: Right test panel from FIG. 1 with paint primer removed by chemical paint stripper.

FIG. 1 shows coatings with self corrosion occurring. FIG. 2 shows the aluminum substrate after the coating was removed with chemical paint stripper. Clearly the degradation was in the coating not the substrate. These corrosion products are unsightly and not desirable for coatings which will be used on objects where visual cleanliness and appearance are important. As such a method or process to inhibit or reduce the self-corrosion of the active aluminum alloy pigment is needed which does not interfere with the sacrificial corrosion performance of the active aluminum alloy pigment.

Example 1

Composition and process to apply a semi-conducting corrosion inhibiting coating to active aluminum alloy pigments.

To one liter of distilled water, add 3.0 grams of basic chromium sulfate, 4.0 grams of potassium hexafluorozirconate, and 0.12 grams potassium tetrafluoroborate. Stir solution until all chemicals are dissolved. Let stand for seven days before use to allow for the inorganic polymer of chromium sulfate to complex with the fluoride salts and equilibrate. Dilute this solution to 40% by volume with distilled water.

Approximately 100 grams of Al—5% Zn—0.015% In particles were added to a one-liter flask. Particles processed were 40 to 100 microns in diameter and spherical. To the flask, add approximately 500 milliliters of inorganic polymer solution at ambient conditions and agitate or stir for approximately five minutes. The powder tends to settle quickly in the solution so constant agitation is necessary. After five minutes, decant off the inorganic polymer solution.

The wet powder was added slowly to a large Buchner funnel with filter paper. After wet slurry was added, a vacuum was applied. Powder was rinsed approximately three times with distilled water to remove unreacted inorganic polymer solution. After rinsing, the powder cake and filter paper were removed and placed on a large watch glass and allowed to dry at ambient conditions overnight. In the morning, the coated powder was dry to handle and placed in a glass container and sealed.

Example 2

Composition and process to apply a semi-conducting corrosion inhibiting coating to 99.99% pure aluminum pigments. An identical process to Example 1 was followed, except the particles coated were globular 99.99% pure aluminum and 10 to 20 microns in diameter.

Example 3

A second composition and process to apply a semi-conducting corrosion inhibiting coating to active aluminum alloy pigments. An identical process to Example 1 except that the active aluminum alloy pigments were 10 to 20 microns in diameter and 2.0 grams per liter of zinc sulfate was added to the inorganic polymer solution after reacting for seven days and after diluting to 40 volume percent.

Example 4

A third composition and process to apply a semi-conducting corrosion inhibiting coating to active aluminum alloy pigments.

An identical process to Example 1 except that the active aluminum alloy pigments were 10 to 20 microns in diameter and 2.0 grams per liter of zinc sulfate and 1.0 gram per liter of glycerol was added to the inorganic polymer solution after reacting for seven days and after diluting to 40 volume percent.

Example 5

A fourth composition and process to apply a semi-conducting corrosion inhibiting coating to active aluminum pigments. An identical process to Example 1 except that the active aluminum pigments were 10 to 20 microns in diameter.

Example 6

Method to mix and apply coating with coated active aluminum alloy pigments compared to coating with uncoated active aluminum alloy pigments and uncoated aluminum alloy pigments with additional ionic corrosion inhibitor.

Coated pigments made in Example 1 were added to a moisture cured urethane resin (Desmodur E-28) at approximately 72 weight percent by pigment/resin load. Liquid coating was spray applied to aluminum alloy test panels of 2024-T3 and 7075-T6 and allowed to cure for 24 hours. After curing, coatings were scribed to the base metal and placed in ASTM B117 and ASTM G85 Annex 4 accelerated salt fog test cabinets. Panels were held in plastic racks at 15 degrees from the vertical.

At the same time, coatings with the same resin system and pigment/resin load were made with uncoated active aluminum alloy particles (40 to 100 micron diameter) with an additional 2.5% by weight of talcite clay or ionic corrosion inhibitor. As a result, coatings of the uncoated active aluminum pigments, coated aluminum pigments and uncoated aluminum pigments and uncoated aluminum pigments with additional corrosion inhibitor were assessed side-by-side.

Figure 3:
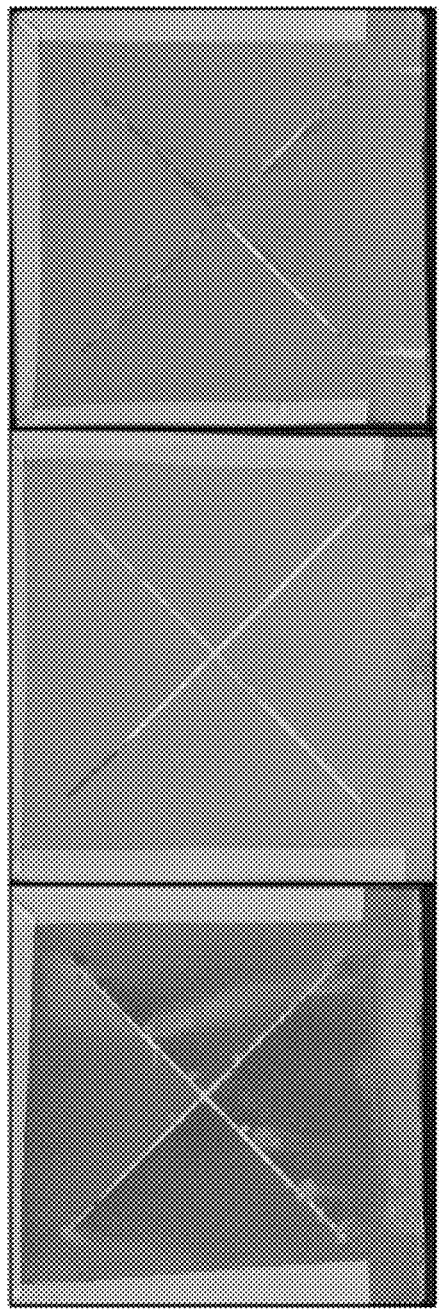
FIG. 3: Urethane coatings on 2024-T3 after 500 hours of ASTM B117 neutral salt fog: uncoated active aluminum pigment, no inhibitor (l), uncoated active aluminum pigment with talcite clay inhibitor (m), coated active aluminum pigment, no inhibitor (r).
Figure 4:
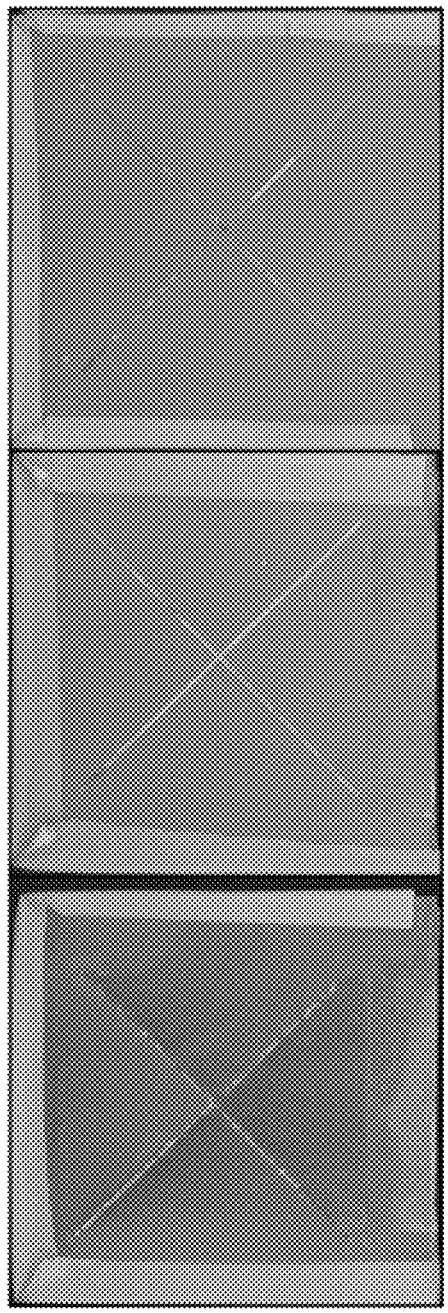
FIG. 4: Urethane coatings on 7075-T6 after 500 hours of ASTM B117 neutral salt fog: uncoated active aluminum pigment, no inhibitor (l), active aluminum pigment with talcite clay inhibitor (m), coated active aluminum pigment, no inhibitor (r).

FIGS. 3 and 4 show the three coatings after 500 hours of exposure to ASTM B117 salt fog. It is clear that by coating the active aluminum pigments a large reduction in self corrosion of the active aluminum pigment is achieved. For 7075-T6, the performance is almost as good as the coating with added ionic-corrosion inhibitor.

Example 7

Method to mix and apply coating with coated active aluminum alloy pigments (Example 5) compared to coating with coated 99.99% pure aluminum pigments (Example 2) and uncoated 99.99% pure aluminum pigments.

Coated pigments made in Example 2 and Example 5 and uncoated 10 to 20 micron 99.99% aluminum pigments were added individually to a moisture cured urethane resin binder (Desmodur E-28) at approximately 72 weight percent by pigment/resin load. Liquid coatings were spray applied to aluminum alloy test panels of 2024-T3 and 7075-T6 and allowed to cure for 24 hours. After curing, coatings were scribed to the base metal and placed in ASTM B117 and ASTM G85 Annex 4 accelerated salt fog test cabinets. Panels were held in plastic racks at 15 degrees from the vertical.

Figure 5:
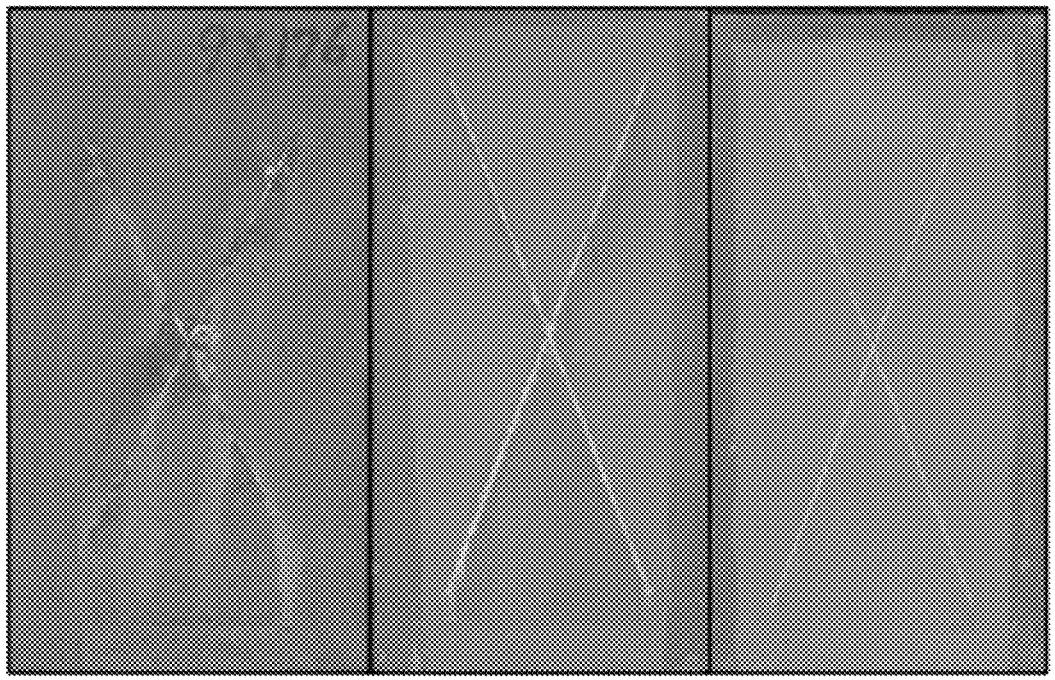
FIG. 5: Urethane coatings on 7075-T6 after 336 hours of ASTM B117 neutral salt fog: uncoated 99.99% pure aluminum pigment, no inhibitor (l), coated 99.99% pure aluminum pigment, no inhibitor (m), coated active aluminum pigment, no inhibitor (r).

FIG. 5 shows performance of coatings on 7075-T6 aluminum panels after 336 hours in ASTM B117 salt fog. The uncoated 99.99% pure aluminum pigment control coating is on the left, the coated 99.99% pure aluminum pigment coating is in the middle, and the coated active aluminum alloy pigment coating is on the right. By comparing the left and middle panels, it is evident that corrosion resistance is improved by coating the 99.99% pure aluminum alloy pigments. The coating process has improved the pure aluminum pigment corrosion inhibition properties and can make pure aluminum and other standard aluminum alloys which naturally form the insulating aluminum oxide coating viable materials to use as a corrosion-inhibiting pigment. The coated active aluminum pigments performed better than either 99.99% pure aluminum pigments, as can be seen by comparing the left and middle panels to the right panel. This example shows the step-wise improvements made by coating a pigment and then using the active aluminum alloy, with no added inhibitors or other chemicals.

FIG. 5: Urethane coatings on 7075-T6 after 336 hours of ASTM B117 neutral salt fog: uncoated 99.99% pure aluminum pigment, no inhibitor (l), coated 99.99% pure aluminum pigment, no inhibitor (m), coated active aluminum pigment, no inhibitor (r).

Example 8

Method to mix and apply coatings with active aluminum alloy pigments with three different coatings. (Comparison of the performance of pigments made in Examples 1, 3, and 4 in urethane polymer coatings)

Coated pigments made in Examples 1, 3, and 4 were added individually to a moisture cured urethane resin (Desmodur E-28) at approximately 72 weight percent by pigment/resin load. Liquid coatings were spray applied to aluminum alloy test panels of 2024-T3 and 7075-T6 and allowed to cure for 24 hours. After curing, coatings were scribed to the base metal and placed in ASTM B117 and ASTM G85 Annex 4 accelerated salt fog test cabinets. Panels were held in plastic racks at 15 degrees from the vertical.

Figure 6:
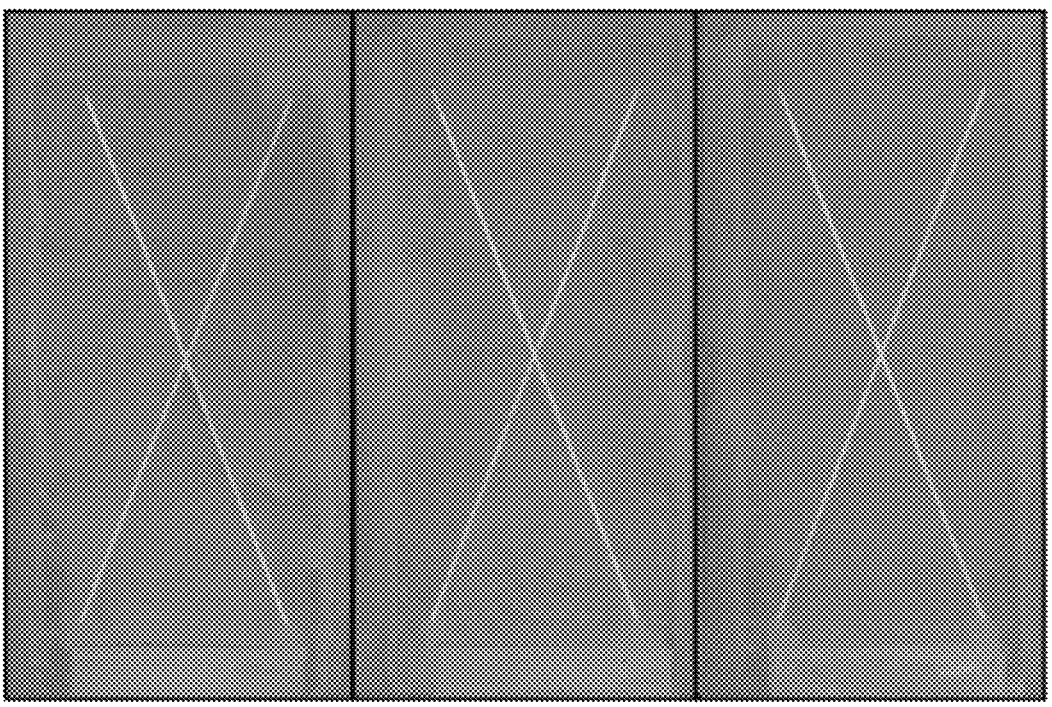
FIG. 6: Urethane coatings on 2024-T3 after 336 hours of ASTM B117 neutral salt fog: coated active aluminum pigment (per Example 1), no inhibitor (l), coated active aluminum pigment (per Example 3), no inhibitor (m), coated active aluminum pigment (per Example 4), no inhibitor (r).

FIG. 6 shows performance of coatings on 2024-T3 aluminum panels after 336 hours in ASTM B117 salt fog. The coated active aluminum alloy pigment per Example 1 is on the left, the coated aluminum alloy pigment per Example 3 is in the middle, and the coated aluminum alloy per Example 4 is on the right. By comparing the three panels, it is evident that the coatings applied by the three different compositions are all effective. Similar relative performance was documented after 2000 hours of exposure. and all are better than the coating made from uncoated active aluminum pigment, as described in Example 6.

FIG. 6: Urethane coatings on 2024-T3 after 336 hours of ASTM B117 neutral salt fog: coated active aluminum pigment (per Example 1), no inhibitor (l), coated active aluminum pigment (per Example 3), no inhibitor (m), coated active aluminum pigment (per Example 4), no inhibitor (r).

Example 9

Method to mix and apply coatings with coated active aluminum pigments made in Example 5 with and without an additional ionic-corrosion inhibitor added to the coating.

Coated particles made in Example 5 were added to a moisture cured urethane resin (Desmodur E-28) at approximately 72 weight percent by pigment/resin load. A second coating was made the same way, except that 2.5 weight % talcite clay inhibitor was added as well. Liquid coatings were spray applied to aluminum alloy test panels of 2024-T3 and 7075-T6 and allowed to cure for 24 hours. After curing, coatings were scribed to the base metal and placed in ASTM B117 and ASTM G85 Annex 4 accelerated salt fog test cabinets. Panels were held in plastic racks at 15 degrees from the vertical.

Figure 7:
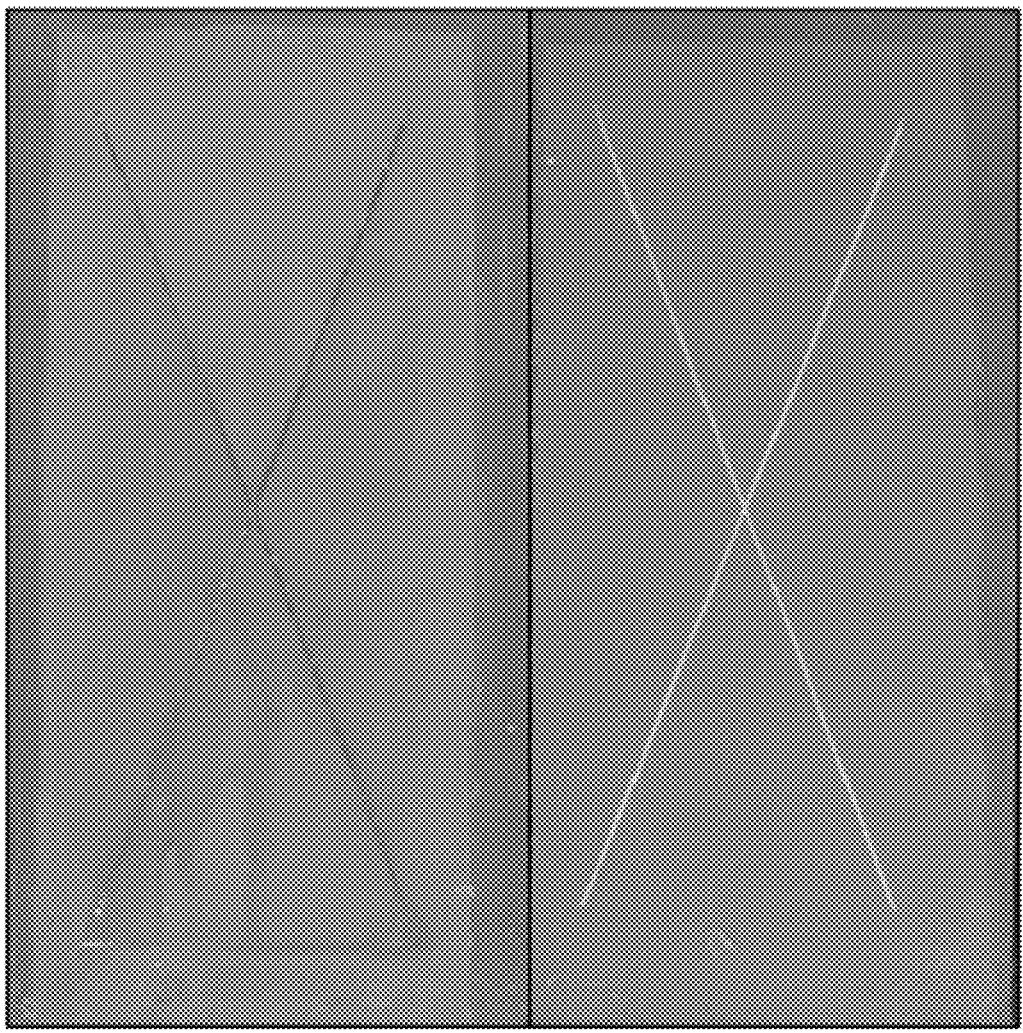
FIG. 7: Urethane coatings on 2024-T3 after 336 hours of ASTM B117 neutral salt fog: coated (per Example 5) active aluminum pigment, no inhibitor (l) and coated (per example 5 with 2.5% talcite clay inhibitor (r).

FIG. 7 shows performance of coatings on 2024-T3 aluminum panels after 336 hours in ASTM B 117 salt fog. The coating with active aluminum alloy pigment coated per Example 5 is on the left and the coating with the active aluminum alloy pigment coated per Example 5 with additional ionic-corrosion inhibitor is on the right. As shown in the FIG. 7, the addition of the inhibitor improves the performance of the coating, eliminating the self corrosion completely.

FIG. 7: Urethane coatings on 2024-T3 after 336 hours of ASTM B117 neutral salt fog: coated (per Example 5) active aluminum pigment, no inhibitor (l) and coated (per Example 5) active aluminum pigment, with 2.5% talcite clay inhibitor (r).

Example 10

Method to mix and apply coatings with uncoated active aluminum particles with additional corrosion inhibitor in a two-component epoxy resin system.

Uncoated 10 to 20 micron diameter Al—5% Zn—0.015% In particles were added to a two-component epoxy resin system (Araldite GZ 571 T-75) at approximately 89 weight percent by pigment/resin load. A second coating was made the same way, except that Nubicoat HWR (a blue pigment) and titanium dioxide were also added at 9.72 and 4.86 weight %, respectively. Both coatings have a talcite clay corrosion inhibitor added at approximately 2.5 weight %. Liquid coatings were spray applied to aluminum alloy test panels of 2024-T3 and 7075-T6 and allowed to cure for 24 hours at ambient conditions and then force cured for 24 hours at 150 F. After curing, coatings were scribed to the base metal and placed in ASTM B117 and ASTM G85 Annex 4 accelerated salt fog test cabinets. Panels were held in plastic racks at 15 degrees from the vertical.

Figure 8:
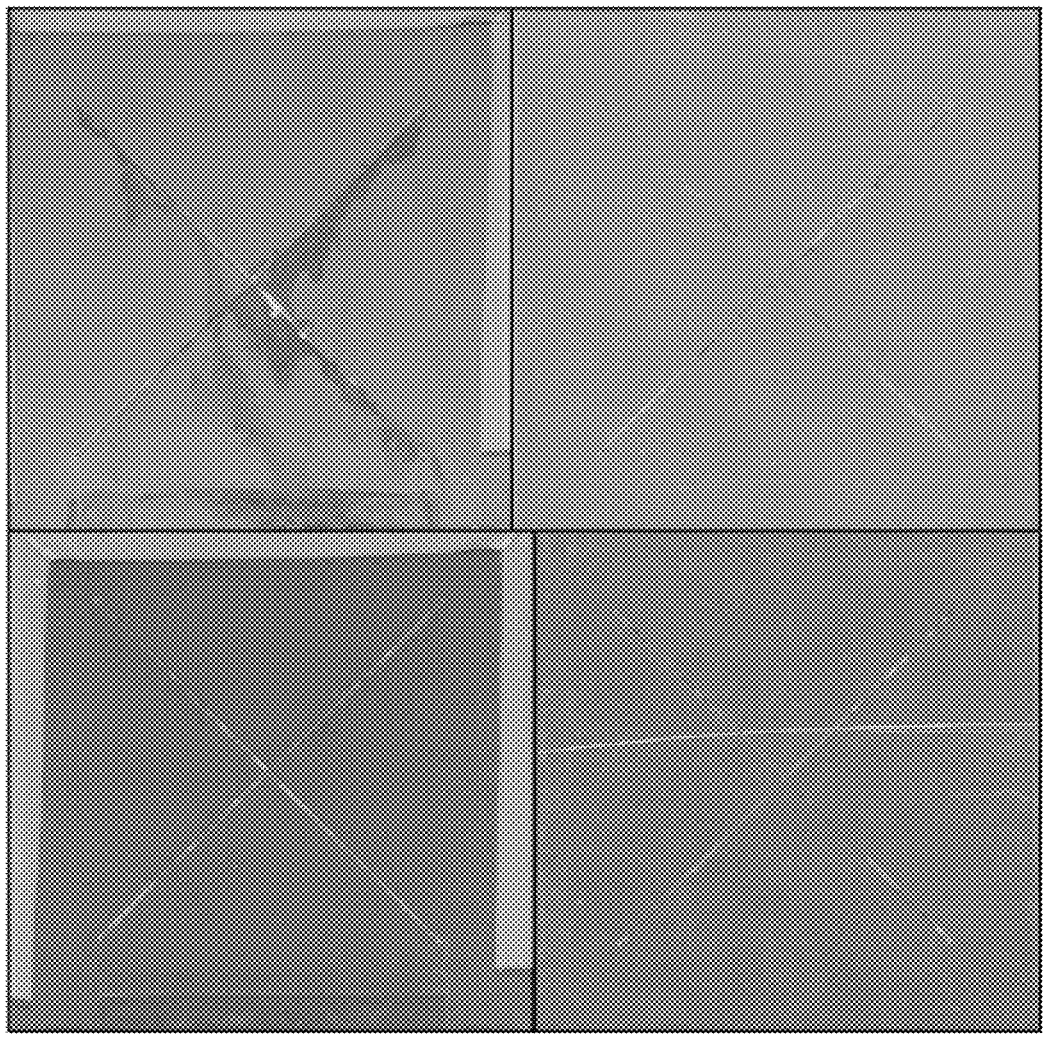
FIG. 8: Epoxy coatings on 2024-T3 after 1000 hours of ASTM B117 neutral salt fog: with uncoated active aluminum alloy pigment (top left) and epoxy coating removed (top right); with uncoated active aluminum pigment, blue pigment and TiO2 (bottom left) and epoxy coating removed (bottom right)

FIG. 8 shows performance of coatings on 2024-T3 aluminum panels after 1000 hours in ASTM B117 salt fog. The panel on the top left is the epoxy coating with active alloy pigment by itself, showing typical self corrosion. The panel on top right is same panel after chemical stripping of the coating, showing no damage to the substrate alloy. The panel on the bottom left is the epoxy coating with active alloy pigment, blue pigment and titanium dioxide. The addition of these materials reduce the self corrosion of the coating and do not lower the corrosion inhibiting characteristics of the active aluminum pigment, as shown by the panel in the lower right, which has the coating removed.

Figure 9:
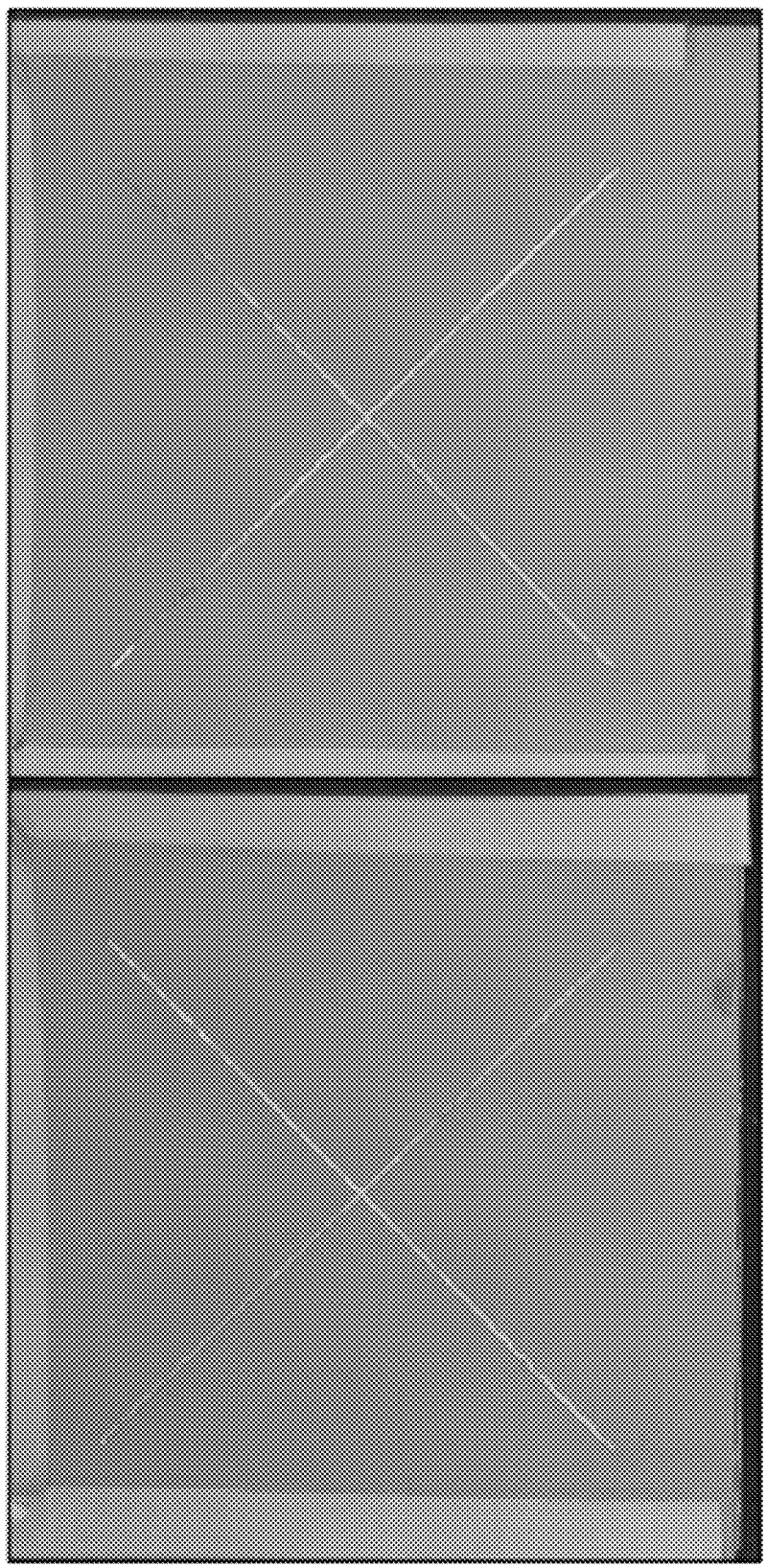
FIG. 9: Polyurethane topcoated coatings from FIG. 8 on 2024-T3 aluminum after 1000 hours of ASTM B117 salt fog. Coating with blue pigment is on the right.

FIG. 9 shows these two coatings with a two-component polyurethane applied on top of them, typical of protective coating systems. After 1000 hours in ASTM B117, there is no corrosion on either panel, demonstrating the excellent corrosion inhibiting properties of the subject coatings. The coating with blue pigment is on the right.

Figure 10:
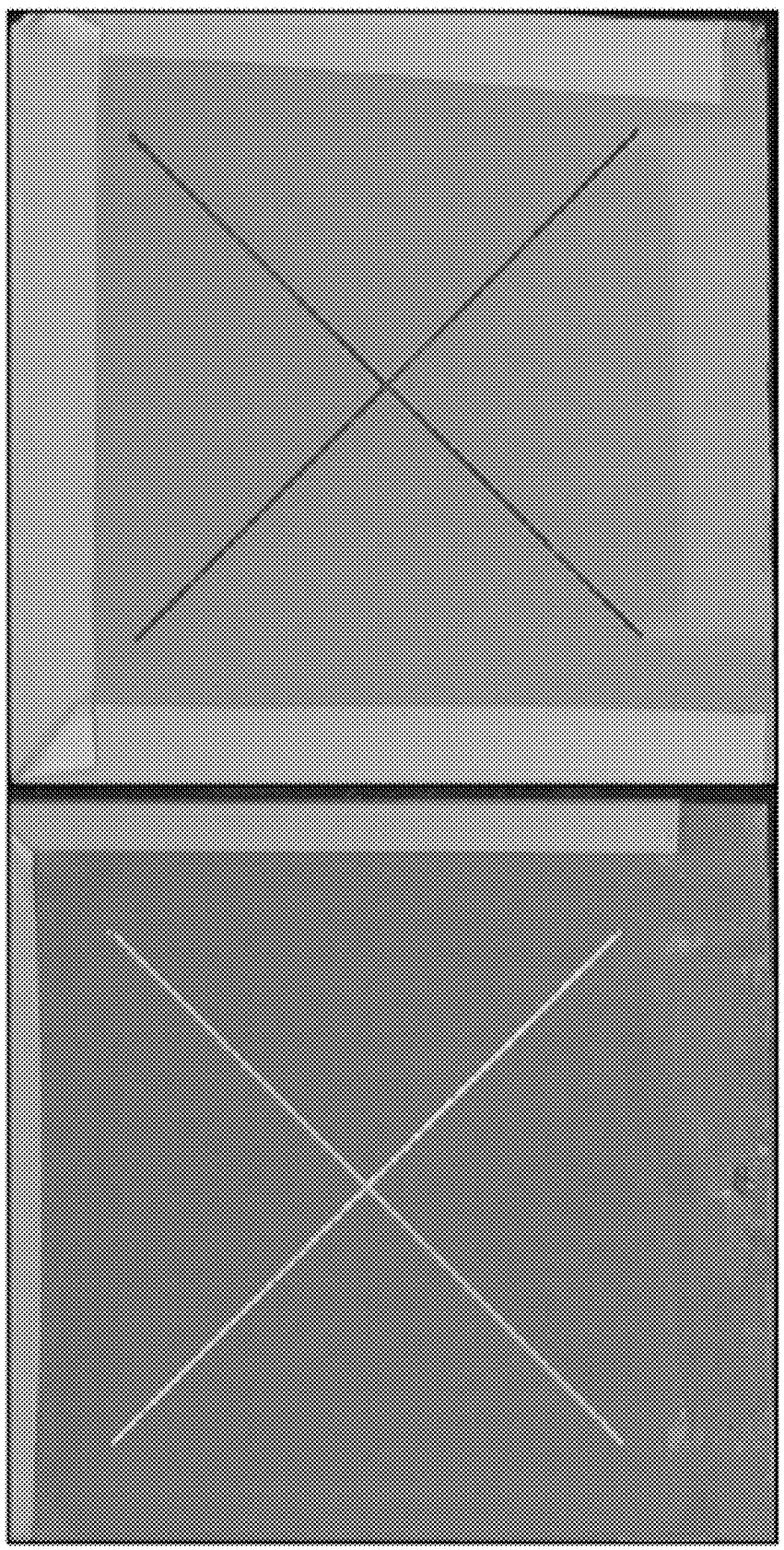
FIG. 10: Blue pigmented epoxy coating with active aluminum alloy on 2024-T3 aluminum after 2000 hours of ASTM G85 Annex 4 "SO2" salt fog. High-solids hexavalent chromium primer is shown beside it for comparison, after only 500 hours of exposure to the SO2 salt fog.

FIG. 10 shows the blue pigmented coating on 2024-T3 aluminum after 2000 hours in ASTM G85 Annex 4 "SO2" salt fog. This is an extremely aggressive test, typically five-times more corrosive than the ASTM B117 salt fog. As shown, there is no corrosion on the panel. This is outstanding performance and far better than the state-of-the art high-solids primers used today on aerospace weapon systems, which is shown next to it for comparison after only 500 hours in SO2 salt fog on 2024-T3 aluminum. These primers are based on hexavalent chromium, a carcinogen, and targeted by countries around the world for elimination. The subject primer has no hexavalent chromium. Testing was stopped on the blue coating at 2500 hours, with no corrosion present.

The examples show that coatings made with a combination of coated aluminum alloy powder-pigment and the addition of an ionic-corrosion inhibitor yield the best coating compositions. These coatings effectively protect the substrate aluminum alloys, 2024-T3 and 7075-T6, in multiple test environments, ASTM B117 and ASTM G85 Annex 4 salt fog. The coated aluminum alloy powder-pigment composition with the additional ionic-corrosion inhibitor are effective regardless of pigment size, from 2 to 100 micron, or binder system, e.g. urethane or epoxy binders. The inorganic polymer solution deposits a semi-conducting corrosion inhibiting zirconium-oxide coating onto the aluminum alloy pigments, regardless of alloy type, and reduces or eliminates pigment self corrosion when said aluminum alloy pigments are added to a binder system, applied to aluminum substrates and exposed to corrosive salt fog.

Specific examples of aluminum alloys used for preparing coatings were obtained from Galvotec, Inc. which has the following chemical analysis:

| Mil - DTL - 24779A | | | | | | | | |
|---|---|---|---|---|---|---|---|---|
| (0.08-0.20) Si | <0.090 Fe | <0.0040 Cu | (4.00-6.50) Zn | <0.0020 Cd | (0.014-0.20) In | <0.0010 Sn | <0.0010 Hg | Balance Al |
| 0.11 | 0.055 | <0.0020 | 5.14 | <0.0010 | 0.018 | ND | <0.0010 | Bal |

The chemical composition of the aluminum alloy useful for preparing the coating compositions of this invention are shown in Table A.

TABLE A

CHEMICAL COMPOSITION

| Element | Conventional Weight (%) | Low Voltage Weight (%) |
|---|---|---|
| Indium | 0.014-0.020 | <0.005 |
| Gallium | N/A | 0.092-0.110 |
| Zinc | 4.0-6.5 | <0.15 |
| Silicon | 0.08-0.20 | 0.10 |
| Copper | 0.004 max | <0.005 |
| Iron | 0.090 max | <0.08 |
| Mercury | 0.001 max | <0.005 |
| Tin | 0.001 max | 0.001 max |
| Nickel | | <0.005 |
| Magnesium | | <0.010 |
| Manganese | | <0.010 |
| Aluminum | Remainder | Remaining |

The inorganic and organic polymeric binders used for preparing the aluminum alloy powder-pigment coating compositions range from about 5 to 80 parts and preferably 30 to 50 parts by weight of the cured coatings.

The film-forming binders used in preparing the aluminum alloy coatings of this invention include polymers derived from the epoxies, isocyanates, acrylics, and the uncured polymers or precursors of these polymers including the polyimides and the precursors, i.e., the polyamic acids. These imide polymers are well known and include polyimide precursors derived from aromatic dianhydrides, polyamines and reactive crosslinkable monofunctional endcaps. Preferred dianhydrides include pyromeliticdianhydride (PMDA); benzophenone tetracarboxylic dianhydride; (hexafluoroisopropylidene)-bis(phthalic anhydride) (HFDA); biphenyltetracarboxylic dianhydride (BPDA); and benzophenone tetracarboxylic dianhydride. Various polyfunctional aromatic amines, including diamines, triamines and tetra-amines and mixtures thereof can be used to prepare the polyimide precursors or polymers. Other known polymers include polymers of the epoxies or epoxy-resins or the precursors, and polymers derived from isocyanates. For purposes of this invention, the term "epoxy precursors" includes epoxy or epoxie compounds having one or more oxirane groups, i.e. an oxygen atom bonded to vicinal carbon atoms. Various precursors of epoxies particularly suitable for purposes of this invention are precursors that are liquid at room temperature. Specifically, the epoxy precursors include compounds which can be characterized either as saturated or unsaturated aliphatic, cycloaliphatic, aromatic or heterocyclic compounds. The curable epoxy precursors may be prepared in various solvents including organic solvents which escape from the coating by evaporation during the curing step. These solvents are well known and include, for example, esters such as butyl acetate, ethyl acetate, acetates of ethylene glycol monoethyl ether (Cellosolve acetate), methyl Cellosolve acetate, and the ether alcohols.

A preferred binder for the Aluminum-X—Y alloy coatings comprises the polyurethanes derived from isocyanates and more particularly the aliphatic polyurethanes derived from the reaction of polyols and multifunctional aliphatic isocyananates. The polyol is preferably used in an organic solvent e.g., toluene, xylene, n-butyl acetate, methylethyl ketone, etc. The hydroxyl number of the polyol, and the isocyanate (NCO) content or the equivalent weights of the isocyanate and polyol are determined in order to obtain the desired polyurethane. The preferred polyols and isocyanates are reacted in approximately stoichiometric amounts so that the NCO to hydroxyl ratio ranges from about 0.85 to 1.6 equivalent of the NCO to 1.0 equivalent of the OH. Specific compounds used in preparing these binders include, for example, isocyanates such as: diphenylmethane-4,4'-diisocyanate, toluene-2,4-diisocyanate, tetramethylene diisocyanate, decamethylene diisocyanate, ethylene diisocyanate, propylene-1, 2-diisocyanate, and the like. Preferred polyisocyanates include hexamethylene diisocyanate and methylene-bis-(4-cyclohexyl isocyanate) e.g., DISMODUR-N. By selecting the proper polyols and by adjusting the NCO to OH ratio, the physical properties and efficiency of the film, such as the strength of film, flexibility, chemical resistance, solvent resistance, etc. can be controlled over a wide range.

Examples of other binders include the polyacrylates, such as the polyalkylacrylates, polymethacrylates, polymethylmethacrylate, polybutylmethacrylate, polyethylmethacrylate, polypropylmethacrylate, and combinations thereof. Also included as binders are the water soluble acrylics latex-emulsion coatings.

Inorganic binders that can be used in the present invention include those described in L. Smith ed., Generic Coating Types: An Introduction to Industrial Maintenance Coating Materials, Pittsburgh, Pa. This Technology Publication is incorporated by reference. For example, the coating compositions prepared with inorganic binders which have a modified $SiO_2$ structure can be derived from silicates, silanes, siloxines or silicones.

The coatings can be applied to the substrate in the form of a suspension or solution in a suitable solvent such as water as in latex coatings or combination of solvents. Application can be carried, out for example, by any technique, such as spraying, brushing, rolling, flooding, immersion, to achieve a suitable coating thickness, ranging up to about ten (10) mils.

A variety of organic solvents are known which can be used for purposes of this invention in preparing organic coatings. The preferred solvents are substantially non-polar or oleophilic solvents. These solvents include aromatic or aliphatic hydrocarbons. Aromatic solvents include benzene, toluene, xylenes, naphtha, and fractions from the distillation of petroleum. Aliphatic hydrocarbon solvents include hexane, cyclohexane, heptanes, octanes, and similar straight and branched hydrocarbons and mixtures thereof, generally having 4-16 carbon atoms. Included are the aliphatic fractions from distillation of petroleum including mineral spirits and various mixtures of these solvents in any ratio. Aqueous systems include the acrylic resins well known for use in latex coatings.

The wetting agents used to apply the coatings to the metal surface are added to the coatings in amounts ranging from about 0.0-5.0 part by weight and preferably in amounts ranging from about 0.1 to 2.0 part. These wetting agents preferably include the lower weight glycols, such as ethylene or propylene glycols, the aliphatic alcohols, alkoxyalcohols, ethers, etheralcohols, glycol ethers, and combinations thereof.

The viscosity or thickening of the coating may be adjusted for the particular method of application by adding water for latex coatings or inert organic solvents for organic coatings. The coated metal surface may be dried by exposure to air or by baking. If the coating composition is of correct viscosity, the coating or film can be applied directly to the metal surface and baking may not be necessary. The film thickness may not be critical, however, an effective amount sufficient to form a coating ranging up to about 0.004 inches or more per square foot for coatings of aircraft frames or other structural members may be sufficient to provide adequate corrosion protection. The corrosion inhibiting coatings are applied onto the metal substrates and onto the aluminum alloy powder-pigments at thickness ranging from about 0.001 to 0.003 inches, e.g., up to ten mils. The coating may be applied by various methods including spraying, rolling, or brushing onto the surface depending on the viscosity. The viscosity of the coating for the particular application may be achieved by adjusting the content of the solvent within the ranges specified and by the selection of the particular reactants used to form the polymeric binder.

While this invention has been described by a number of specific examples, it is obvious to one skilled in the art that there are other variations and modifications which can be made without departing from the spirit and scope of the invention as particularly set forth in the appended claims.

What is claimed is:

1. An electrochemically corrosion-resistant composition for application onto metal substrates consisting essentially of, in parts by weight, from about 5 to 80 parts of a film-forming binder selected from the group consisting of an inorganic binder, polyurethanes, polyimides, polyacrylates, polymers derived from diisocyanates, polymers derived from epoxies and the uncured prepolymers of said polymers, from about 0.0 to 10 parts of at least one ionic-corrosion inhibitor, from about 0.0 to 5.0 parts of at least one wetting agent, from about 0.0 to 5.0 parts of solvent, and from about 20 to 80 parts of a galvanic aluminum alloy powder-pigment prepared in an atmosphere selected from the group consisting of oxygen, nitrogen/inert gas and nitrogen-hydrogen having a particle size ranging from about 2 to 100 microns; said aluminum alloy powder-pigment coated with an effective amount of a semi-conducting corrosion inhibitor and has the formula Aluminum-X—Y, wherein X is an element selected from the group consisting of zinc, cadmium, magnesium, barium, and manganese and Y is an element selected from the group consisting of indium, gallium, tin and bismuth; said semi-conducting corrosion inhibitor consist essentially of an acidic aqueous solution of from about 0.01 to 22 parts of a trivalent chromium compound, from about 0.01 to 12 parts of hexafluorozirconate, from about 0.01 to 12 parts of at least one fluorocarbon selected from the group consisting of tetra fluoroborates, hexafluorosilicates, and hexafluorotitanates, from about 0.00 to 12 parts of at least one divalent zinc compound, and from about 0.00 to 5 parts by weight of a water soluble organic corrosion inhibitor.

2. The corrosion-resistant composition of claim 1, wherein at least one of the divalent zinc compounds is zinc sulfate.

3. The corrosion-resistant composition of claim 1, wherein the pH of the acidic aqueous solution ranges from about 2.5 to 5.5.

4. The corrosion-resistant composition of claim 1, wherein the ionic-corrosion inhibitor is selected from the group consisting of an inorganic talcite clay, benzimidazole, benzothiazole, benzoxazole, diphenyltriazole, benzotrizole, and tolytriazole.

5. The corrosion-resistant composition of claim 1, wherein said ionic-corrosion inhibitors are present in the corrosion resistant composition in amounts ranging from about 1.0 to 10 parts by weight.

6. The corrosion-resistant composition of claim 1, wherein an effective amount of the semi-conducting corrosion-inhibitor coating ranges from about 10 parts by weight of the semi conducting corrosion inhibitor to about 100 parts by weight of the aluminum alloy powder-pigment.

7. The corrosion-resistant composition of claim 1, wherein the aluminum alloy powder-pigment is Aluminum-Zinc-Indium and has a particle size ranging from about 20-40 microns.

8. The corrosion-resistant composition of claim 1, wherein the ionic-corrosion inhibitor is talcite clay and the aluminum alloy powder-pigment is Aluminum-Zinc-Indium.

9. The corrosion-resistant composition of claim 1, wherein the Aluminum-X—Y powder-pigment ranges from about 50 to 70 parts and the film-forming binder ranges from about 50 to 30 parts.

10. The corrosion-resistant composition of claim 1, wherein the inorganic film-forming binder is a siloxane.

11. The corrosion-resistant composition of claim 1, wherein the solvent is water.

* * * * *